(12) United States Patent
Bates et al.

(10) Patent No.: US 6,414,807 B2
(45) Date of Patent: *Jul. 2, 2002

(54) METHOD AND APPARATUS FOR OPTICALLY SENSING ACCURATE CLOCK PATTERNS

(75) Inventors: Charles A. Bates, Saratoga; Lawrence M. Bryant, Palo Alto; David S. Kuo, Castro Valley; Eric G. Rawson, Saratoga, all of CA (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 16 days.

(21) Appl. No.: 09/120,695

(22) Filed: Jul. 22, 1998

Related U.S. Application Data

(60) Provisional application No. 60/053,439, filed on Jul. 22, 1997.

(51) Int. Cl.$^7$ .................................................. G11B 5/09
(52) U.S. Cl. .............................. 360/51; 360/75; 360/53; 360/77.03; 360/78.11; 369/53.34; 369/47.28
(58) Field of Search .............................. 360/51, 75, 53, 360/77.03, 78.11, 135; 369/52, 53, 54, 53.34, 53.12, 53.11, 53.1, 52.1, 47.28

(56) References Cited

U.S. PATENT DOCUMENTS

| | | | | |
|---|---|---|---|---|
| 5,268,801 A | * | 12/1993 | Hazel et al. ............. | 360/77.03 |
| 5,442,172 A | * | 8/1995 | Chiang et al. ....... | 360/77.63 X |
| 5,909,333 A | * | 6/1999 | Best et al. ........... | 360/77.63 X |

FOREIGN PATENT DOCUMENTS

| | | | |
|---|---|---|---|
| JP | 5-303852 | * 11/1993 | ............... 360/75 B |

OTHER PUBLICATIONS

Lawrence M. Bryant, "Prior Art Statement Regarding 'Method and Apparatus for Optically Sensing Accurate Clock Patterns'", Nov. 30, 1998 (1 page).
MicroE, "Rotary Micro Encoder, Data Sheet, 5T16 Series", 1996 (2 pages).
MicroE, "Rotary Micro Encoder, Data Sheet, 5T33 Series", 1996 (2 pages).
U.S. Digital Corporation, "Optical Shaft Encoder, S1 & S2 Series, Technical Data", Feb. 1996 (1 page).
U.S. Digital Corporation, "Optical Shaft Encoder, SP–16, Technical Data", Feb. 1996 (1 page).

* cited by examiner

*Primary Examiner*—Alan T. Faber
(74) *Attorney, Agent, or Firm*—David K. Lucente; Derek J. Berger; Shawn B. Dempster

(57) ABSTRACT

A disk drive system is described for forming and reading precise optically detectable patterns on rotating members of a disk and spindle assembly used in data storage system. In particular the invention describes a magnetic disk drive employing a laser system to form and sense optical clock patterns placed on the rotating members of the disk drive. These optically detectable patterns are used to create an accurate clock track. The clock may be used to create multiple accurate magnetic patterns on one or more disks attached to a disk and spindle assembly in a magnetic data storage system. By successively changing the radius at which the magnetic patterns are created it is then possible to create multiple magnetic patterns at successive radii with all such magnetic patterns having a precise geometric relationship to each other. Alternatively, the accurate clock pattern may stand alone as an encoder. Additionally, the laser system may also be used to form textured surfaces on a disk to control the flying characteristics of a magnetic head slider assembly. These textured surfaces may also serve as a resting area for the magnetic head slider assembly when the disk is not spinning.

20 Claims, 5 Drawing Sheets

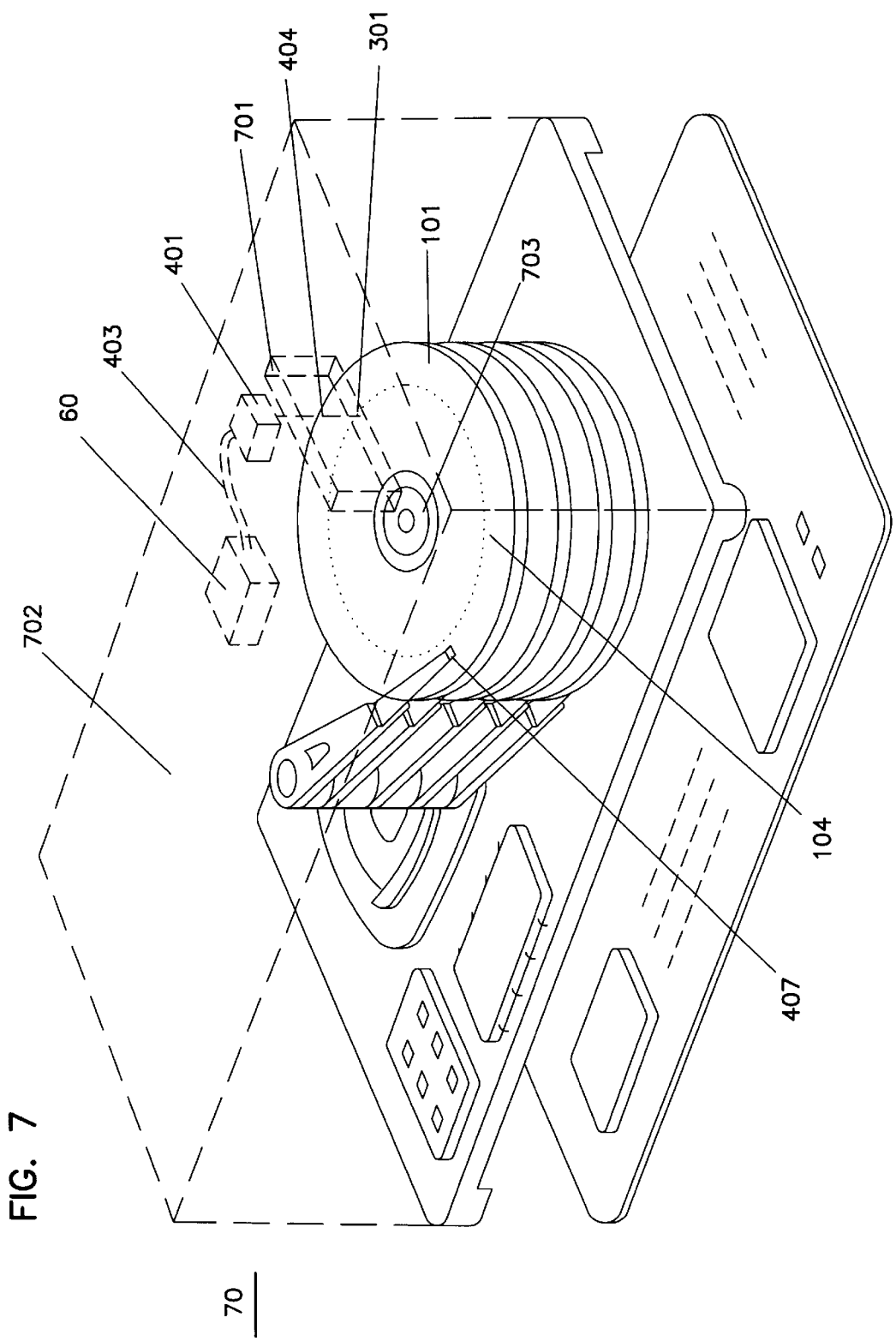

METHOD AND APPARATUS FOR OPTICALLY SENSING ACCURATE CLOCK PATTERNS

RELATED APPLICATIONS

This invention is related to the concurrently filed and copending U.S. patent application Ser. No. 09/120,707, filed on Jul. 22, 1998, entitled "Method and Apparatus for Forming Accurate Clock Patterns" which concerns a method of forming patterns sensed using the present invention. This invention also derives from and claims priority to Provisional Application Serial No. 60/053,439 filed on Jul. 22, 1997.

FIELD OF INVENTION

This invention relates to a method and apparatus for servowriting a disk drive, in particular, a magnetic disk drive. More particularly, the method and apparatus may be used with a sealed head-disk assembly by employing an optical source to sense an optically detectable pattern formed previously on a rotating surface of the head-disk assembly, thereby eliminating the need to servowrite in a contamination controlled environment, and eliminating the need for a servowriter clock head assembly.

BACKGROUND OF THE INVENTION

In the present art of manufacturing rotating disk magnetic data storage devices, referred to as disk drives, it is necessary to place accurate magnetic patterns, referred to as servo patterns, on the surface of one or more disks in the disk drive. These servo patterns are used during normal operation of the disk drive as position reference points in order to place the magnetic read and write heads of the disk drive at any particular radius of any disk so that data may be written to or read from the magnetically alterable surface of the disk. Typically these patterns also contain information describing the angular position of the disk as well as the radius so that magnetic data may be written to, or read from, precise geometrically defined areas of any disk in the disk drive. Ordinarily, these patterns are written on one or more of the disk surfaces in a disk drive by a machine referred as a servowriter. In order to write the accurate magnetic patterns on the disk, the servowriter uses an accurate clock signal as a reference for the placement of these patterns.

The accurate clock signal must maintain a precise geometric relationship with the rotating disk assembly while the servo patterns are being formed. In order to attain the necessary precision, it is a present practice to form the accurate clock on the surface of at least one of the disks in the disk drive. Typically, a separate magnetic head assembly, commonly referred to as a clock head assembly, which is part of the servowriter, forms this accurate clock. During clock pattern formation, the clock head assembly is typically moved to the outer radius of at least one of the disks in the disk drive. At this radial position the clock head assembly forms a magnetic clock pattern on at least one of the disks in the disk drive. After this clock pattern is formed, it is then sensed by the same clock head assembly or another clock head assembly for use as an accurate reference clock for forming servo patterns on the surface of one or more of the disks in the disk drive.

The present art for most disk drives requires that the disk and spindle assembly be kept very clean and free of contamination. Otherwise, the surface of the disks may be physically damaged, destroying the data storage capability of the disks. To prevent this contamination, the disk and spindle assembly of the disk drive is placed in a sealed enclosure during normal use. However, in order to use the clock head assembly to form and sense the accurate reference clock, an opening must be made in the sealed enclosure. Unfortunately, this opening permits contamination to enter the otherwise sealed disk and spindle assembly enclosure. Moreover, the clock head assembly itself may become contaminated and thereby transfer contamination through the opening and into the enclosure when it is moved into place near the disks. To reduce the risk of damage resulting from such contamination, the accurate clock pattern and the servo patterns are typically placed onto the disks in a contamination-controlled environment such as in a clean room or underneath a flow-hood. To further reduce contamination, the magnetic heads of the clock head assembly are regularly changed. The cost of buying and maintaining clean rooms is substantial as is the cost of suitable flow hoods. The cost of replacement magnetic heads for the clock head assembly is also substantial.

Accordingly, there is a need for a method and apparatus for sensing optically detectable patterns formed on the surfaces of the rotating members of a disk drive.

SUMMARY OF THE INVENTION

The present invention replaces the magnetic clock head assembly of a servowriter with an optical sensor which detects an optically detectable pattern on the surface of one of the magnetic disks or, for that matter, on the surface of any of the rotating members of the disk and spindle assembly of a disk drive. This optically detectable clock pattern is formed by optical light pulses which are focused on one or more of the aforementioned surfaces. This clock pattern formation is typically done at some prior step in the disk drive manufacturing process by a separate device designed for forming such optically detectable clock patterns. This pattern-forming device may also be advantageously used to form textured surface patterns on the disk surface which may be used to control the flying height of a head which flies over the disk. Additionally, this optically detectable clock pattern-forming device may be advantageously employed to form a textured surface pattern on a disk surface in order to control the friction characteristics between a head and disk when the head comes into contact with the disk.

The present invention is a method and apparatus for reading an optically formed clock pattern from the surface of one or more of the rotating members of a disk drive. An accurate clock is formed using a signal generated by an optical sensor which detects or reads the previously formed optically detectable clock pattern. The disk drive then uses this accurate clock to form servo patterns on one or more of the disks in a disk drive. The optical sensor of the present invention can remain outside of the disk and spindle enclosure of the disk drive and senses the optically detectable pattern by passing a light beam through an opening in the disk and spindle enclosure of the disk drive. This opening may optionally be covered with a transparent window. By sensing the clock pattern from outside the sealed enclosure the risk of damage from contamination is greatly reduced. As a result, the use of clean rooms and flow hoods becomes unnecessary for the formation of servo patterns on the disks of a disk drive. The monetary cost of buying and maintaining clean rooms and flow hoods and replacing magnetic heads for the servowriter clock head assembly can be reduced or eliminated.

BRIEF DESCRIPTION OF THE DRAWINGS

The reference numbers used in the drawings are intended to refer to the same component throughout the specification.

FIG. 7 is a perspective view of a disk drive having a sealed enclosure shown in phantom.

DETAILED DESCRIPTION OF THE INVENTION

Figure 1:
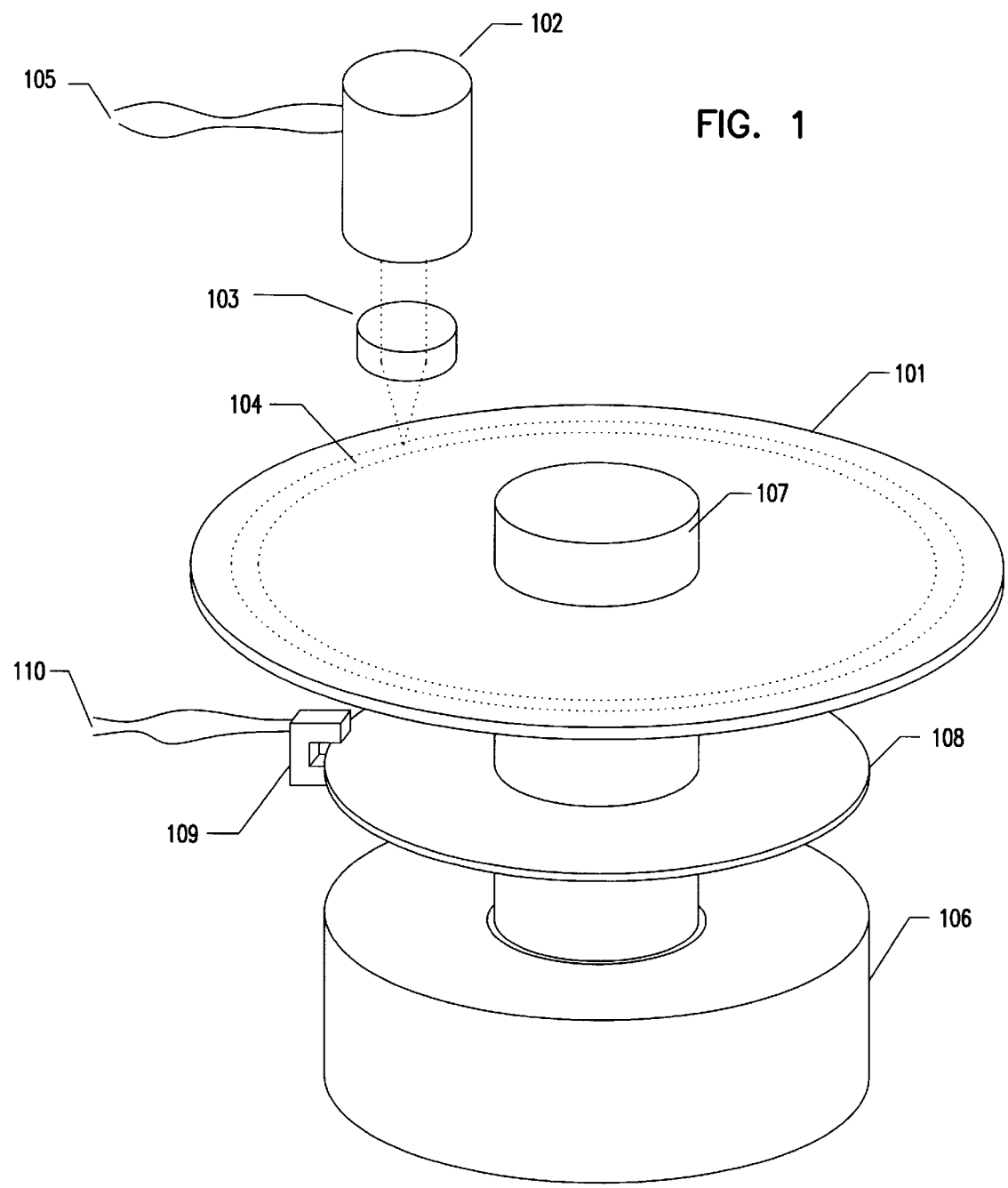
FIG. 1 is a perspective view of an embodiment of an apparatus for forming an optically detectable pattern on a disk.

FIG. 1 illustrates a system for initially forming a typical optically detectable pattern on a rotating member of a magnetic disk drive, in this case a disk, by using an optical source such as a laser. Although the optically detectable pattern is formed on a disk in FIG. 1, it would be within the scope of the present invention to form the optically detectable pattern on any rotating member of the spindle and disk assembly of a disk drive. Although the present invention may be practiced using any type of computer storage media (e.g. optical disks, magneto-optic disks, magnetic disks, etc.), the preferred embodiment senses patterns placed on magnetic storage disks. Typically, such disks store information magnetically using a magnetically alterable surface. The magnetically alterable surface may be formed either before or after the optically detectable clock pattern 104 is formed. Typically, a disk 101 is composed of a glass, metal, or plastic substrate with several layers of other materials applied to the surface of the substrate. At least one layer of the materials applied to the surface of disk 101 is a magnetically alterable material on which magnetic patterns will be stored.

Figure 3:
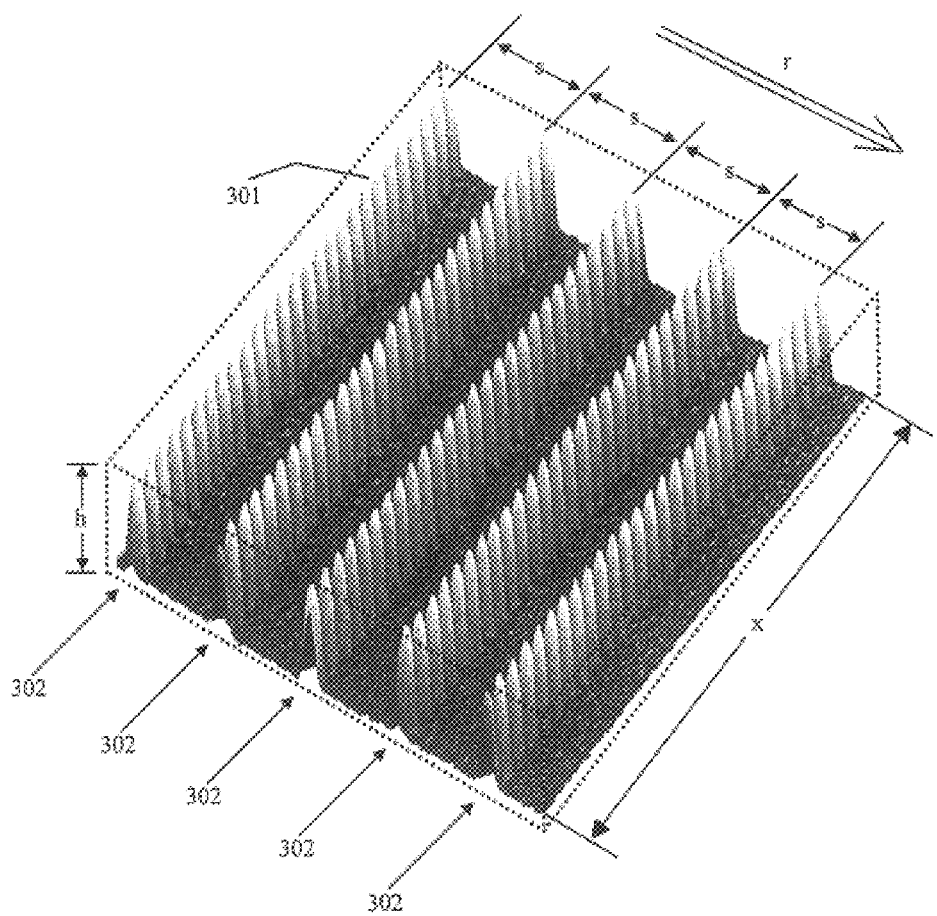
FIG. 3 is a magnified perspective view of a portion of an optically detectable pattern formed on a disk as in FIG. 1 and sensed by the present invention.

A typical pattern is formed by focusing the output of an optical source 102 onto the surface of a disk 101 using an objective lens 103. The optical source 102 is controlled by an electrical signal passed through wires 105. The optical source itself may be an electrically modulated laser such as a semiconductor laser or a gas discharge laser or a continuous laser which feeds its optical output through a separate modulator such as an electro-optic or acousto-optic modulator. Although the pictured embodiment uses a laser system 102, the invention may be practiced using any optical system which emits optical output pulses in response to an electrical signal and has an optical wavelength and power output capable of forming an optically detectable pattern on a disk 101. Such systems are known and understood to those with ordinary skill in the art. One embodiment mounts a laser system 102 and objective lens 103 on a positioning system (not shown) for focusing the laser optical output on disk 101 at any desired radial distance from the center of disk. An optically detectable pattern 104 is formed at a specific radius using the laser. It should be noted that the optically detectable pattern might take a variety of forms. For example, the pattern may consist of "bumps" in endless variety of specific shapes (e.g. craters, double-rimmed craters, cones, domes, etc.). Furthermore, the invention may incorporate pattern variations in color, shape, size, density, conformation, frequency, etc. The key criteria are that the patterns are readable or detectable using an optical sensor. The preferred embodiment uses patterns of laser formed physical deformations in the disk surface. An example of such a pattern is depicted in FIG. 3.

Typically, the clock pattern is formed by a separate pattern forming apparatus which temporarily attaches a disk 101 to a high precision spindle 107 which is attached to a high precision motor 106. By using the motor 106 to rotate the high precision spindle 107 and focusing the optical output from the optical source 102 onto the disk surface 101, a highly accurate circular pattern 104 of optically detectable features is formed on the surface of disk 101. This optically detectable pattern 104 may be formed at any chosen radius. Optionally, a code wheel 108 containing an optical or magnetic pattern can be used as a reference pattern for forming the optically detectable pattern 104 on the disk surface 101. Associated with the code wheel 108 is a sensor 109 for detecting the pattern on code wheel 108 and producing a signal on wires 110. This resulting "sensor signal" operates and, once processed through an optical pattern generator, controls the optical source. In this way, the sensor signal controls the optical source which creates the clock pattern on the disk 101 surface. It can be readily appreciated that the optical source can be controlled by means other than a code wheel. For instance, data stored on a "floppy" disk or "hard drive" or a computer "plug-in" card all serve equally well.

In addition to the advantages described above, the optical system provides another unique advantage. An optical pattern forming apparatus has the ability to form physical deformations on the surface of disk 101 for purposes other than clock formation. Such physical deformations of the disk surface may be used to control the flying height of a magnetic head slider over the surface of disk 101. This physical deformation of the disk surface may also be used to form textured regions of a disk surface 101 where a magnetic head slider may come to rest when the disk is not spinning. This is significant because the smooth surfaces of the magnetic storage disks are prone to binding with the magnetic head sliders (See, 407 of FIG. 4) when disk rotation ceases and the magnetic head sliders come to rest on the disk surface 101. This surface binding makes restarts difficult and potentially damaging to the disk and head slider. To prevent this from occurring, the pattern forming apparatus forms physical deformations in the surface of the disk 101. These deformations serve as suitable surfaces for the magnetic head slider to rest on when the disk is not rotating. This helps prevent the disk/head-binding problem and eases restarts thereby reducing disk drive failures.

Figure 2:
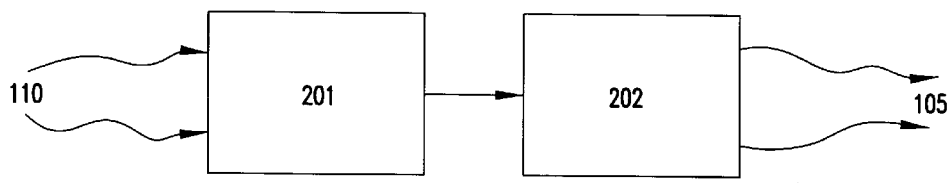
FIG. 2 illustrates a block diagram of one embodiment of an electronic system used with a pattern forming apparatus.

Referring to FIG. 2, a code wheel detector 201 accepts the controller signal from the code wheel sensor 109, on wires 110, and converts the signal into a logic level signal which is then carried into optical pattern generator 202. The code wheel signal (on wires 110) may be a continuously varying analog signal or a logic level signal. Code wheel detector 201 may contain signal-processing circuitry to convert the signal into a logic level signal if the code wheel sensor signal is not already a logic level signal. Code wheel detector 201 may also contain electronic filters for reducing extraneous noise contained in the code wheel sensor signal on wires 110. The optical pattern generator 202, need only be a circuit capable of accepting a logic level signal from code wheel detector 201 and capable of producing signals suitable for controlling the optical source 102.

The optical pattern generator 202, optionally contains a phase locked loop (PLL) circuit. This PLL is constructed such that the frequency and/or phase of the signal emitted by the optical pattern generator on wires 105 are precisely related to the frequency and/or phase of the code wheel signal on wires 110. The PLL circuit of the optical pattern generator 202 may also contain an input divider circuit and a feedback divider circuit. The PLL input divider may be constructed to divide by any integer from 1 to N while the PLL feedback divider may divide by any integer from 1 to M. This constrains the frequency of the signal on wires 105 to the frequency of the code wheel signal on wires 110 multiplied by the ratio M divided by N. Therefore, the PLL circuit of the pattern generator 202 enables the optical source control signal on wires 105 to conform to one of many different frequencies with each frequency precisely related in frequency and phase to the code wheel signal on wires 110. In addition, by constraining the operating bandwidth of the PLL contained in pattern generator 202, extraneous noise contained in the code wheel signal on wires 110 is significantly reduced, thereby increasing the precision of the signal on wires 105 and the precision of formation of the optically detectable pattern on disk 101. For example, by constraining the PLL to a frequency of 5-kilohertz (kHz), noise components above 5 kHz which may be present in the code wheel signal will be reduced. Other PLL bandwidths may also be chosen in order to optimize precise formation of the optically detectable pattern on a disk 101, depending upon the characteristics of the code wheel signal on wires 110 and the dynamics of the spinning disk 101.

FIG. 3 depicts a small portion of one example of a pattern formed by one application of the pattern forming apparatus of FIG. 1 in conjunction with the pattern forming electronic system of FIG. 2. Each semi-conical raised "bump" 301 shown in FIG. 3 is an optically detectable feature (i.e. a physical deformation) formed by the reaction of the disk 101 surface to the optical energy of an individual optical output pulse from the optical source 102. If disk 101 is rotated in direction ("r") another such physical deformation can be created at a location which has ("S") angular distance from the first. If disk 101 is rotated through a complete revolution, a series of such physical deformations can be created around the entire radial circumference at a first radius of the disk. If, after one revolution of disk 101, the optical source 102 or objective lens 103 or both are moved to a second radius and the disk is rotated through a second revolution, a second series of physical deformations can be formed at this second radius of the disk. By using the apparatus of FIGS. 1 and 2, each physical deformation 301 at this second radius can be formed at an angular position which is very closely coincident with a physical deformation formed at the first radius. Similarly, a third such series of physical deformations can be formed at a third radius, and so forth, until a number of series of deformations are formed at a number of radii. The formation of a series of physical deformations can also be performed by the pattern forming system of the present invention by continuously rotating disk 101 while also continuously moving the optical source 102 or objective lens 103 or both from some first radius to some second radius creating a spiral composed of equally spaced physical deformations lying along a set of specific angular positions around a rotation of the disk and also lying along a set of equally spaced radii of the disk. Therefore, each row of such optically detectable physical deformations (as depicted in the exemplar of FIG. 3) from lower left to upper right lies along a radius line projected from the center of disk rotation and are created by rotating the disk 101 on a spindle 107 with motor 106 while forming such optically detectable features around an entire revolution of the rotating disk 101 with the optical source 102 which is controlled by the pattern forming electronics of FIG. 2 and while simultaneously moving the optical source 102 and objective lens 103 from a first radius of disk 101 toward a second radius of disk 101.

The exemplar of FIG. 3, shows the height ("h") dimensions of the optically formed features 301. Typically, the individual features 310 are formed at a single predominate height which may vary from as little as 50 nanometers (nm) to as high as 5000 nm. The pattern forming apparatus is capable of forming features throughout this range of heights. The row to row spacing ("S") of each row of formed features lying along each radius line 302, from lower left to upper right, corresponds to an equal angle and an integer number of rows formed around a revolution of the disk. It must be noted that, although the rows 302 of FIG. 3 appear parallel, the row spacing S is an angular distance and each radius line 302 will converge with the others at the center of the disk. Each disk may feature as few as 50 rows, where S is one fiftieth of a revolution, or as many as one million, where S is one millionth of a revolution. It must also be noted that the present invention is not limited to the feature size and shape shown in FIG. 3 and that the height, shape and spacing of the optically detectable features can be controlled over a wide range by the pattern forming system of the present invention. Therefore, FIG. 3 represents only one of a multitude of possible patterns which may be suitable as an optically detectable pattern 104. The radial width ("x") of each row 302 may be chosen so that a plurality of individual features 301 in each row 302 are simultaneously sensed by an optical sensor such as sensor 401 which will thereby further reduce errors caused by possible imprecision in the formation of individual features by averaging across a number of such features. This plurality of features 301 in each row 302 may be as few as three or as many as a few thousand in order to obtain such error reduction by sensing the average position of features in a row. After an optically detectable pattern 104 is formed by the above described manner, the disk 101 may undergo further processing in order to produce a disk which is suitable for use in a data storage disk drive system. As long as optically detectable pattern 104 retains the needed characteristics to be optically detectable, such manufacturing processing would be within the scope of the present invention. These criteria of retaining detectability after further processing would also apply if the optically detectable pattern were formed on any other rotating member of a disk drive spindle and disk assembly.

Figure 4:
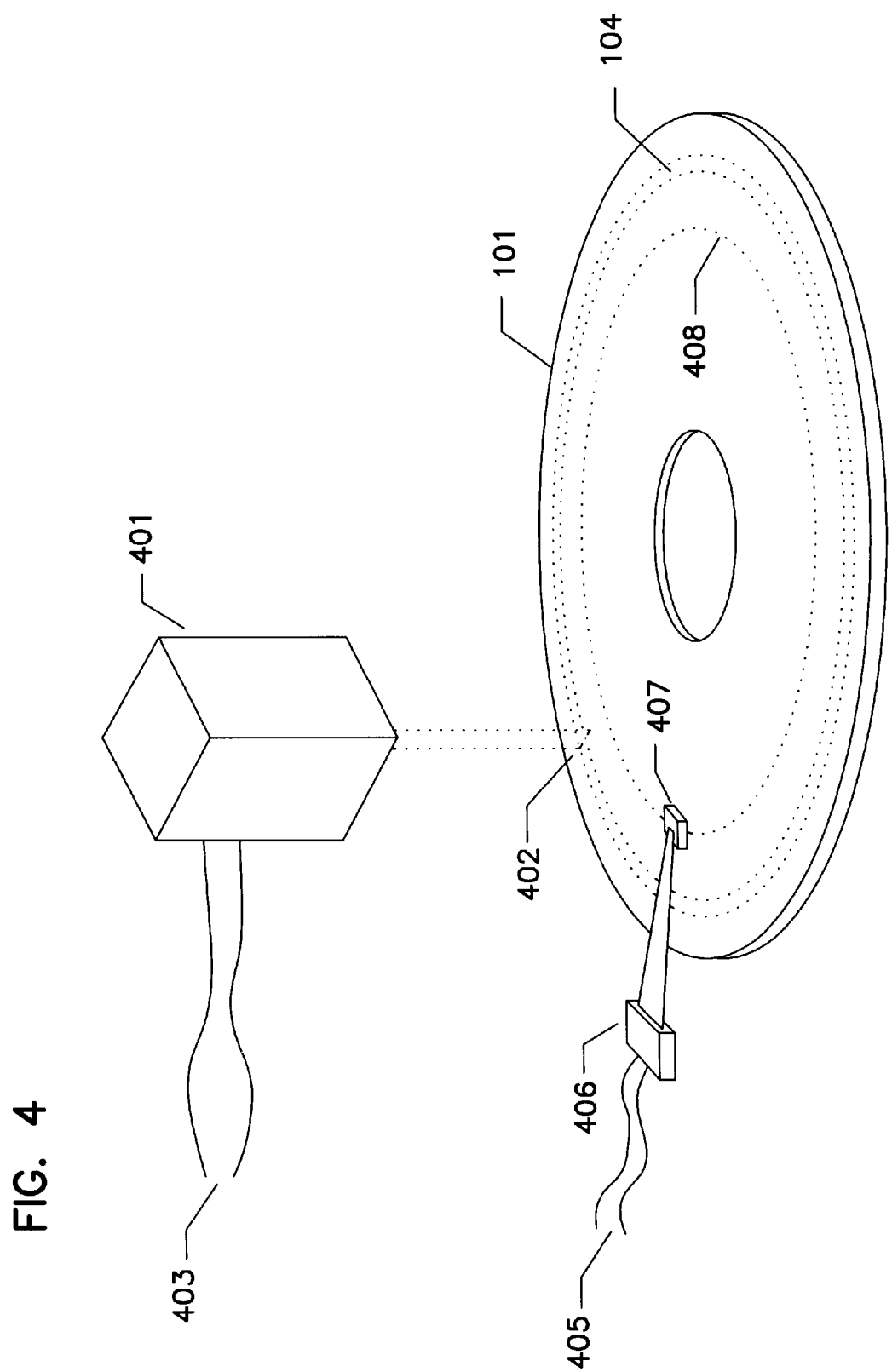
FIG. 4 is a perspective view of one embodiment of an apparatus for sensing optically detectable patterns of the type shown in FIG. 3.

FIG. 4 illustrates an embodiment of the present invention for sensing an optically detectable pattern 104 formed on disk 101 and then converting the sensed pattern into an electrical signal. Although FIG. 4 depicts an optically detectable pattern which is located on a magnetic storage disk, it would be within the scope of the present invention to form the optically detectable pattern on any rotating member of the spindle and disk assembly of a magnetic disk drive. The optical system 401 projects an optical beam 404 which forms optical image 402 on the optically detectable pattern 104. This image is reflected back into the optical system 401, where it is converted into an electrical signal by a photodetector typically located in the optical system 401. Typically, the optical system 401 is comprised of an optical source and a photodetector which forms part of an optical sensor. The optical image 402 created by the optical system 401 is suitably sized and shaped so that an appropriate amount of optical energy is either reflected directly back from disk 101 into optical sensor 401, or is deflected away from the optical sensor 401 by the shape of optically detectable pattern 104. Wires 403 carry the electrical signal created by the photodetector of the optical sensor 401. The wires 403 carry the signal to a pattern detector/clock generating circuit (for example, the circuit shown in FIG. 6). The focal length of optical image path 404 and reflected optical return path 404 of optical sensor 401 are both designed to be sufficiently long to accommodate some amount of motion of disk 101 away from or toward optical sensor 401 without causing any degradation in the resulting electrical signal generated by the photodetector of the optical sensor. Disk 101 is mounted on the spindle (not shown) of a magnetic disk drive used for storing computer information. The spindle rotates the disk whenever the disk drive is operating and during the formation of the servo patterns on the magnetically alterable surface.

The disk drive is, in turn, mounted in a fixture (also not shown) for holding it and optical sensor and head actuator assembly 406 in a defined physical relationship to each other. The precise details of the structure of the aforementioned magnetic disk drive and the associated fixture can be understood by any person with ordinary skill in the art of designing or building magnetic disk drives and related production equipment and are therefore not shown herein. However, the preferred embodiment uses an optical sensor 401 which uses a laser to read the clock pattern. When the magnetic disk drive spins a disk 101, the previously aligned optical sensor 401 projects an optical image onto the optically detectable pattern 104 creating a reflected image inside the optical sensor. The reflected image is received by the photodetector of the optical sensor. The photodetector creates an electrical signal in proportion to the reflected image. This electrical signal is passed through wires 403. The optical sensor signal on wires 403 may be a continuously varying analog signal, or optionally, optical sensor 401 may contain signal-processing circuitry for producing a logic level signal on wires 403. Once the sensor 401 senses the accurate clock pattern 104, this information can be used to write a magnetic pattern 408 using the magnetic head 407.

Figure 5:
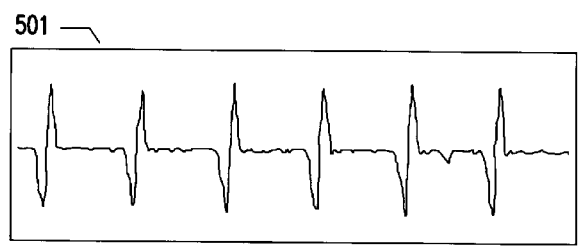
FIG. 5 represents an oscillograph of an electrical signal created by the optical sensor of FIG. 4 with the ordinate reflecting signal intensity and the abscissa representing time.

FIG. 5 illustrates a typical oscillograph of a continuously varying analog signal 501 generated by the present invention which may be carried on wires 403 in response to disk 101 being rotated beneath an optical sensor 401 with said sensor 401 aligned over the optically detectable pattern 104. Since the physical deformations 301 composing the optically detectable pattern 104 may be formed in many differing shapes it can be appreciated that signal 501 may also take on many differing shapes.

Figure 6:
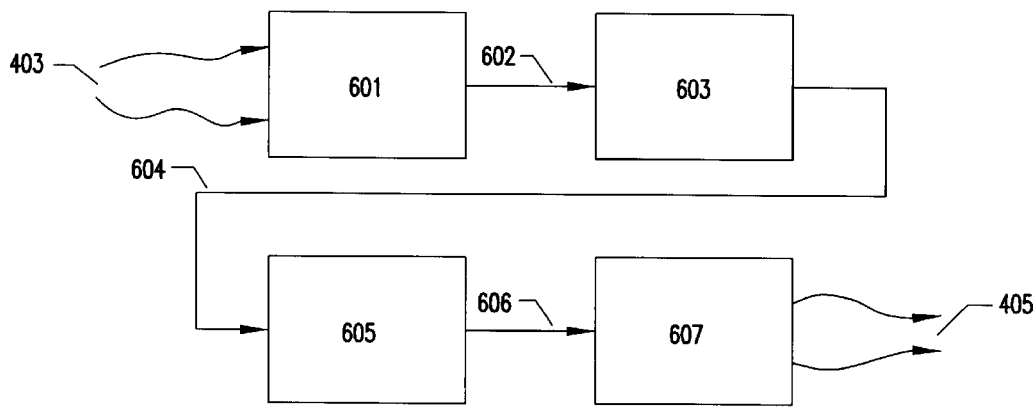
FIG. 6 is a block diagram for one embodiment of an electronic system used with the pattern sensing apparatus of the present invention.

FIG. 6 illustrates a circuit 60 which can be used by the present invention to generate a magnetic pattern 408 on disk 101 in response to the electrical signal carried by wires 403 from optical sensor 401. Pattern detector 601 accepts the signal from optical sensor 401 on wires 403 and forms the optical sensor signal into a logic level signal which is then carried into clock generator 603. The construction of pattern detectors 601 and clock generators 603 are well known and are easily constructed by one with ordinary skill in the art. Pattern detector 601 contains circuitry which can convert the optical sensor signal on wires 403 into a logic level signal if this optical sensor signal is not already a logic level signal. Pattern detector 601 also may contain electronic filters for reducing extraneous noise contained in the optical sensor signal on wires 403. Pattern detector output signal 602 is connected to clock generator 603 which may contain a phase locked loop ("PLL") circuit which may in turn contain an input divider circuit and may also contain a feedback divider circuit. This PLL circuit, contained in clock generator 603, precisely relates the frequency or phase (or both) of the optical sensor signal on wires 403 to the frequency or phase (or both) of accurate clock signal 604. If the PLL input divider circuit in 603 is constructed to divide by any integer from 1 to N and the PLL feedback divider circuit in 603 is constructed to divide by any integer from 1 to M then the frequency of accurate clock signal 604 will conform to the frequency of the optical sensor signal on wires 403 multiplied by the ratio M divided by N. Therefore, the PLL circuit contained in the clock generator 603 creates an accurate clock signal 604 which conforms to one of many different frequencies with each possible frequency precisely related in frequency or phase (or both) to the optical sensor signal on wires 403. By also constraining the operating bandwidth of the PLL contained in clock generator 603, extraneous noise in the optical signal on wires 403 can be significantly reduced thereby increasing the precision of accurate clock signal 604, thereby increasing the precision of the magnetic patterns to be formed on the magnetically alterable surface of disk 101.

Referring to both FIG. 4 and FIG. 6 the accurate clock signal 604 is connected to magnetic pattern generator 605 which uses accurate clock signals 604 to create a pattern signal 606. Pattern signal 606 is a logic level signal consisting of a varying pattern created by magnetic pattern generator 605 in response to accurate clock signal 604. Pattern signal 606 is connected to magnetic write circuit 607 which converts pattern signal 606 into a signal suitable for the magnetic recording head in magnetic head assembly 407. The magnetic write circuit 607 is connected to the recording head in magnetic head assembly 407 by means of wires 405. Magnetic head assembly 407 is positioned by means of head arm assembly 406 at a first radius of spinning disk 101. The magnetic recording head in magnetic head assembly 407 then creates a first accurate magnetic pattern 408 in the magnetically alterable surface of disk 101. The varying pattern created by magnetic pattern generator 605 is typically designed so that the accurate magnetic patterns formed in the magnetically alterable surface of disk 101 by the magnetic recording head in the magnetic head assembly 407 can, at a later time, be sensed by the magnetic read (playback) head of the head assembly 407 and provide timing and position information to the circuitry of the magnetic disk drive (not shown) in which the disk 101 is mounted. The head arm assembly 406 may then be moved so that magnetic head 407 is positioned at a second radius of disk 101 and second accurate magnetic pattern may be created at this second radius by means of this optical sensor 401, pattern detector 601, clock generator 603, magnetic pattern generator 605, magnetic write circuit 607 and the magnetic recording head in magnetic head assembly 407. Due to the precision of the frequency or phase (or both) of accurate clock signal 604 the pattern formed at this second radius will have an accurate geometric relationship to the first accurate magnetic pattern formed on the magnetically alterable surface of disk 101. Head arm assembly 406 may then be moved again so that magnetic head 407 is positioned at a third radius of disk 101 and a third accurate magnetic pattern may be created in the same manner as the first and second. In this way, a multitude of accurate patterns may be created across the entire magnetically alterable surface of the disk. Each one of these multitudes of accurate patterns will have an accurate geometric relationship to the first accurate magnetic pattern formed on the magnetically alterable surface of disk 101 and to each other.

FIG. 7 shows a disk drive having a pattern sensing apparatus which performs in accordance with the principles of the present invention. FIG. 7 shows the optical sensor 401 in position on a disk drive 70. The optical sensor 401 is shown projecting an optical beam 404 onto optically detectable features 301 of a clock pattern 104 formed on a disk 101 surface. The beam 404 is projected through a transparent window 701 in the disk drive sealed enclosure 702. The clock pattern 104 is formed on the disk 101, but may also be formed on the disk drive spindle 703. The clock pattern of the disk is sensed by the detector of the optical sensor 401 and sent through wires 403 to the pattern detecting and clock generating circuit 60 for processing which allows servo patterns to be formed using the magnetic read/write head 407 of the disk drive. The optical sensor 401 is moved to the appropriate radius to read clock patterns formed at said radii.

It should be particularly noted that the present invention can sense patterns formed by a device for forming clock patterns and textured landing zones such as that disclosed in the concurrently filed Patent Application, entitled "Method and Apparatus for Forming Accurate Clock Patterns" filed on Jul. 22, 1998.

The present invention has been particularly shown and described with respect to certain preferred embodiments and features. However, it should be readily apparent to those of ordinary skill in the art that various changes and modifications in form and details may be made without departing from the spirit and scope of the invention as set forth in the appended claims. For example, the shape and sizes of the optical pattern may be many and varied. The invention disclosed herein may be practiced using elements which are not specifically disclosed herein. Alternative sources for reference patterns may be used as may be alternative code wheel embodiments. Finally, it is within the scope of the invention to sense optical patterns placed on a wide variety of data storage media.

What is claimed is:

1. A pattern sensing apparatus for a disk drive, comprising:
    a substantially sealed enclosure;
    rotating members, at least one of said rotating members having at least one planar surface;
    physical features integrally formed with and raised relative to said at least one planar surface, said physical features further being optically detectable clock patterns;
    an optical source positioned to project an optical beam onto said optically detectable clock patterns; and
    means for sensing said optically detectable clock patterns and converting said patterns into an accurate clock signal.

2. An apparatus as in claim 1, wherein said means for sensing and converting comprises an electronic circuit which uses said accurate clock signal to create a magnetic pattern on a magnetic disk.

3. An apparatus as in claim 1 wherein said accurate clock signal is used as an index.

4. An apparatus for sensing optically detectable patterns of a disk drive, said apparatus comprising:
    a) a substantially sealed enclosure containing rotating members of said disk drive;
    b) at least one of said rotating members being a data storage disk having optically detectable features on at least one surface thereof;
    c) optical means for sensing said optically detectable features and for creating an output signal;
    d) said enclosure having an opening such that the optical means, positioned adjacent to said opening, can sense said optically detectable features; and
    e) an electronic circuit for processing said output signal into an accurate clock signal.

5. An apparatus as in claim 4, wherein said opening in said enclosure further comprises a transparent window.

6. An apparatus as in claim 4, wherein said optical means comprises a laser system.

7. An apparatus as in claim 4, wherein said optical means directs an optical beam, through said opening, onto said optically detectable features of said rotating members to create a reflected beam which is detected by said optical means to create said output signal.

8. An apparatus as in claim 4, wherein said electronic circuit for processing said output signal contains a phase locked loop circuit.

9. An apparatus as in claim 8, wherein said phase locked loop circuit produces an electronic signal having a frequency and phase that is precisely related to said output signals frequency and phase, or precisely related to the time averaged output signal frequency and phase.

10. An apparatus as in claim 4, wherein said electronic circuit for processing said output signal corrects for irregularities in said optically detectable pattern to produce the accurate clock signal.

11. An apparatus as in claim 4, wherein said electronic circuit for processing said output signal produces the accurate clock signal as the position of said rotating members varies due to mechanical offsets and rotational irregularities.

12. An apparatus as in claim 4, wherein said output signal is series of electrical pulses and said electronic circuit converts said pulses into an accurate clock signal.

13. An apparatus as in claim 4, wherein said data storage disk is of a type selected from a group consisting of optical storage disks, magneto-optic storage disks, and magnetic storage disks.

14. An apparatus as in claim 4, wherein said data storage disk also has a textured surface, said optically detectable features and textured surface being formed by the same apparatus.

15. An apparatus for sensing optically detectable patterns on a disk drive, comprising:
    an enclosure;
    at least one data storage disk rotatably mounted in the enclosure;
    a first set of physical features formed on the at least one data storage disk, the
    first set of physical features being arranged in the form of a first circle; and
    a device for detecting the physical features.

16. The apparatus of claim 15, and further comprising:
    a second set of physical features arranged in the form of a second circle, each one of the second set of physical features being radially aligned with a corresponding one of the first set of physical features.

17. The apparatus of claim 15, in which each of the physical features has a height of at least 50 nm.

18. The apparatus of claim 15, in which the physical features are of varying size and/or shape.

19. The apparatus of claim 15, in which the device for detecting the features comprises:
    an optical beam for being directed onto the physical features so as to create a reflected beam;
    a photodetector for intercepting the reflected beam; and
    an electrical circuit for converting the reflected beam into an accurate clock signal.

20. The apparatus of claim 19, in which the optical beam is a laser beam.

* * * * *